Oct. 4, 1966 W. H. BENNETT 3,276,725
NAVIGATION SYSTEM UTILIZING ION PROBES
Filed Sept. 12, 1962 6 Sheets-Sheet 1

INVENTOR.
WILLARD H. BENNETT

BY *J. E. Carnahan*

AGENT

Oct. 4, 1966　　　　　W. H. BENNETT　　　　3,276,725
NAVIGATION SYSTEM UTILIZING ION PROBES
Filed Sept. 12, 1962　　　　　　　　　　　　6 Sheets-Sheet 3

INVENTOR.
WILLARD H. BENNETT

BY L E Carnahan

AGENT

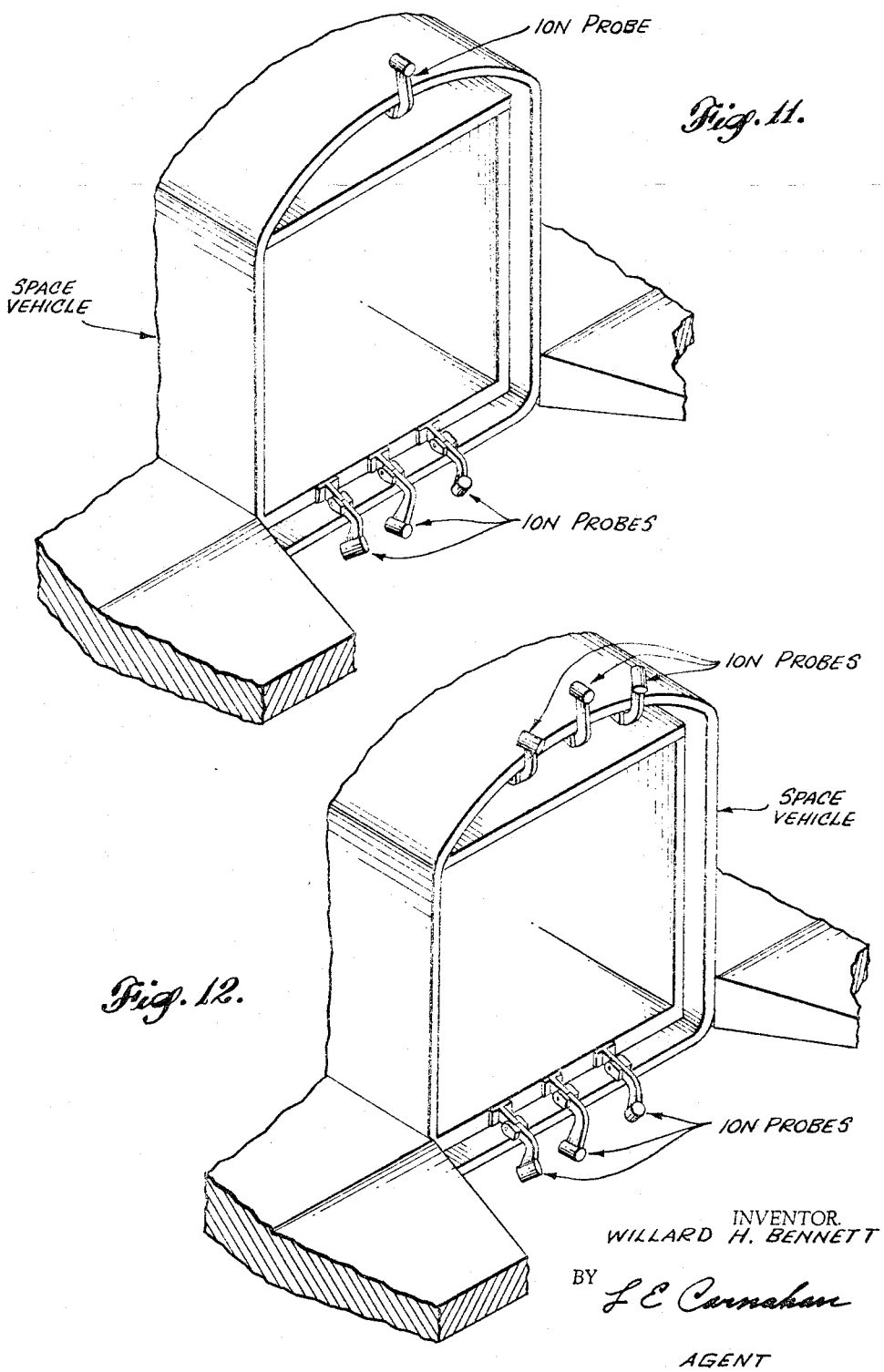

Oct. 4, 1966  W. H. BENNETT  3,276,725
NAVIGATION SYSTEM UTILIZING ION PROBES
Filed Sept. 12, 1962  6 Sheets-Sheet 6
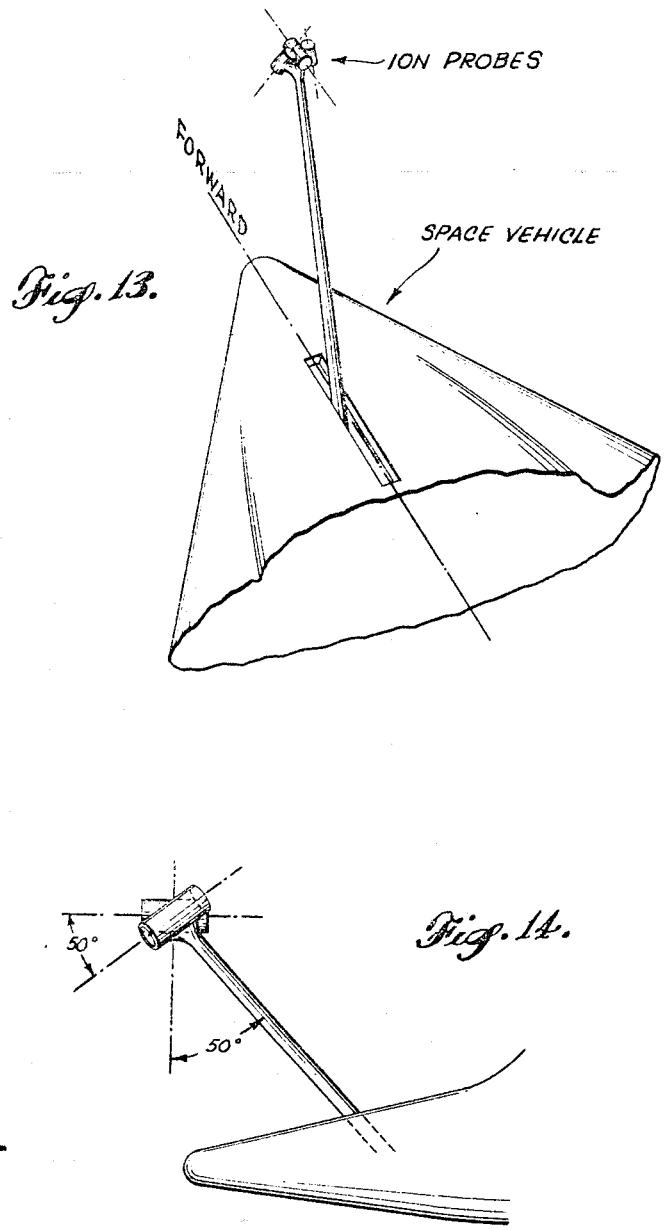
INVENTOR.
WILLARD H. BENNETT
BY L E Carnahan
AGENT United States Patent Office 3,276,725
Patented Oct. 4, 1966

3,276,725
NAVIGATION SYSTEM UTILIZING ION PROBES
Willard H. Bennett, Raleigh, N.C., assignor to The Boeing Company, Seattle, Wash., a corporation of Delaware
Filed Sept. 12, 1962, Ser. No. 223,182
3 Claims. (Cl. 244—14)

This invention relates to ion probes and more particularly to ion probes for application on space vehicles. More particularly, this invention relates to a space vehicle navigation system utilizing ion probes.

At the present time, the only means available to the pilot of a space vehicle down to an altitude of about 250,000 feet for determining his velocity, altitude and aspect is his primary inertial navigation system. He has no independent means by which to discover malfunctioning of that system. This deficiency is so serious that consideration has even been given to having two inertial systems. However, such duplication would not overcome the deficiency because two similar systems are much more liable both to malfunction in similar manners than are two dissimilar ones.

The ion probe is entirely different from the inertial system in principle. Properly used in the initial part of the flight and up to the formation of a strong shock front during re-entry, ion probes can be used for measuring and giving to the pilot a prompt visual presentation of: (1) the velocity of the vehicle through the atmosphere (not relative to the earth as the inertial system does); (2) the angle of attack and the yaw of the vehicle again relative to the atmosphere; and (3) the initial stages of the formation of a bow shock and the associated temperature increase during re-entry. The ion probes in their early stage of development were not suitable for use as primary flight control instruments during and following re-entry, but further development has extended their range of usefulness.

It should be emphasized that the ion probes work just as well in the extremely low density upper atmosphere and in space, as they do lower down, and that they would not seriously lose sensitivity until they have fallen to an altitude between 150,000 and 200,000 feet. Thus the ion probes can provide the pilot with important information with which to approach re-entry while he is still in too rarified an atmosphere for any of his pressure gauges or temperature gauges to work properly.

When manned space vehicles are put in orbit the ion probes will become especially needed because the great extension in flight time will be at altitudes where the ion probes are particularly effective.

It is therefore an object of the present invention to provide a navigation system utilizing ion probes.

Another object of the invention is to provide a navigation system utilizing ion probes to be used singularly or with an inertial navigation system.

A further object of the invention is to provide a navigation system utilizing ion probes in the low density upper atmosphere and in space.

A still further object of the invention is to provide a navigation system utilizing ion probes in altitudes below 250,000 feet to provide the pilot with important information with which to approach re-entry while in atmosphere too rarified for pressure and temperature gauges to work properly.

Another object of the invention is to provide a navigation system utilizing ion probes having knitted grids and a split cylinder type collector plate in combination with a diaphragm.

Another object of the invention is to provide a pilot with means for ascertaining in a rapid and continuing manner his orientation relative to the direction of his motion through the medium.

Another object of the invention is to provide a pilot with aspect sensing means which do not contain any moving parts other than an electric meter.

These and other objects of the invention not specifically set forth above will become readily apparent from the accompanying description and drawings in which:

FIGURES 1–4 are presented to aid in the understanding of the construction and function of an ion probe wherein:

FIGURE 1 shows in schematic form a side view thereof;

FIGURES 2 and 2a show typical current and voltage curves;

FIGURE 3 shows current-time and voltage-time curves indicating a cut-off potential; and FIGURE 4 shows current-time and voltage-time curves indicating reduction of current and retarding of potential.

FIGURE 9 is an enlarged cross-sectional view of the ion probe shown in FIGURE 7 and taken on line 9—9 of FIGURE 9a.

FIGURE 11 is an isometric sketch of a four-probe installation on a space vehicle.

FIGURE 12 is an isometric sketch of a six-probe installation.

FIGURE 13 is an isometric sketch of a three-probe installation projecting from the nose of a space vehicle.

FIGURE 14 is a side view of the three-probe installation of FIGURE 13.

FIGURE 15 shows the three-probe unit of FIGURE 14 looking in a forward direction and from the top of the unit.

The same elements throughout the drawings are indicated by like reference numerals.

Figure 1:
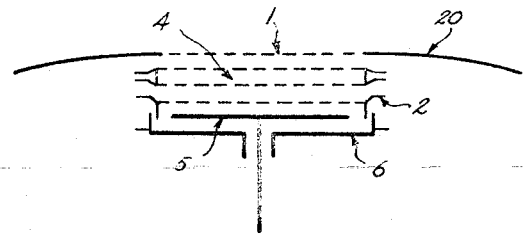

As used in previous and current applications on high altitude vehicles, and disclosed in my co-pending application Serial No. 163,373, filed December 29, 1961, now Patent No. 3,222,562, the ion probe consists of four grids and a collector as illustrated in FIGURE 1. The grids are made with knitted 0.001-inch tungsten wire nets stretched and fastened to grid rings stamped from 0.010-inch Nichrome. These grids are identical with the grids in the non-magnetic mass spectrometer in high altitude rockets which has been used in measuring the composition of the upper atmosphere.

In the figure, outer grid 1 is connected to the outer vehicle surface 20 and is grounded to the vehicle. This grid is needed in order that electric fields from charged electrodes of the probe will not appreciably protrude into the space surrounding the vehicle and interfere with the free flow of charged particles towards the ion probe.

The next two grids are interconnected to form a grid doublet 4 and it is to these that a saw-tooth swept retarding potential is applied. The reason that a doublet is utilized is that the electric potential across the openings in a single grid is not uniform whereas the potential in the midplane between the two grids of a doublet is more nearly uniform. The retarding electrode must be able to apply a sharp and well-defined cut-off potential upon the incoming ions if the ion probe is to be able to make accurate measurements.

The last grid 2 is held at a suitable negative potential such as 30 volts relative to the vehicle when the ion probe is to be used for measuring ions, in order to repel all incoming electrons and also to suppress all photoelectrons emitted from collector 5. The collector is surrounded by an electrostatic shield 6 which may be grounded to the vehicle.

Figure 2:
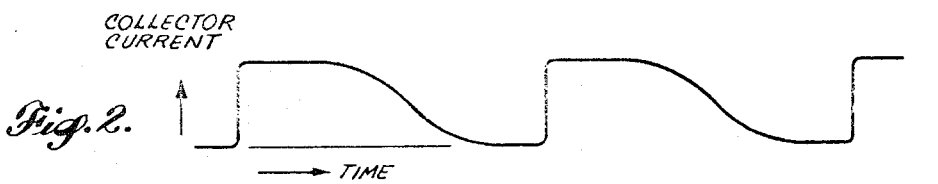
Figure 2A:
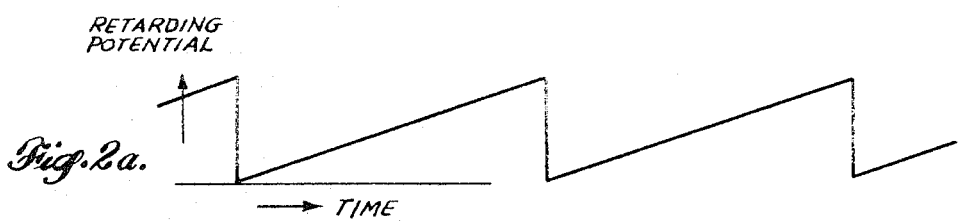

The ion current reaching the collector 5 is amplified and telemetered to the ground. A typical kind of record is represented schematically in FIGURES 2 and 2a in which FIGURE 2 represents the observed collector current and FIGURE 2a represents the concurrent retarding potential applied to the grid doublet. Atomic oxygen ions approaching the ion probe on a vehicle traveling at $7 \times 10^5$ centimeters per second will each have 4 electron volts of kinetic energy relative to the vehicle. If the vehicle is not electrically charged, a retarding potential of 4 volts or more will have to be applied to the grid doublet to prevent the atomic oxygen ions from reaching the collector.

Figure 3:
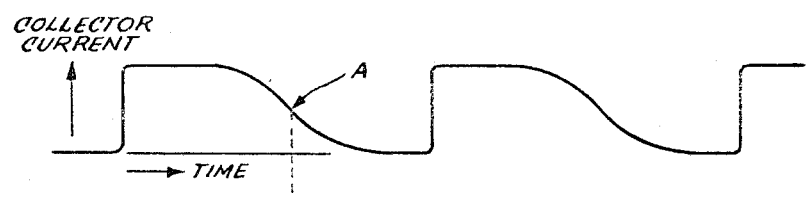
Figure 3:
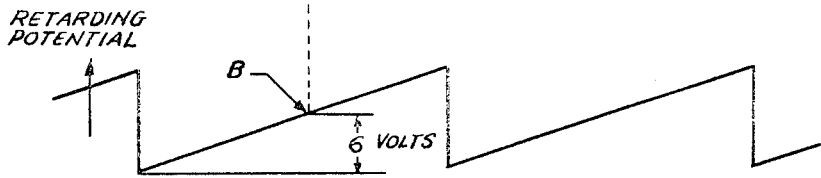

It has generally been found, both with the mass spectrometer and more recently with the ion probe, that a vehicle in the upper atmosphere acquires a negative potential of about two volts and this negative potential increases the energy with which the ions encounter the ion probe. Consequently the retarding potential which must be applied to the grid doublet must be increased by this amount, and the retarding potential in the above example woud have to be 6 volts or more to stop the atomic oxygen ions which are at rest in the rarified atmospheric medium. In FIGURE 3, the point A is chosen halfway down on the current-time curve and the corresponding point B, directly below on the voltage-time curve is at the cut-off potential of 6 volts.

Figure 4:
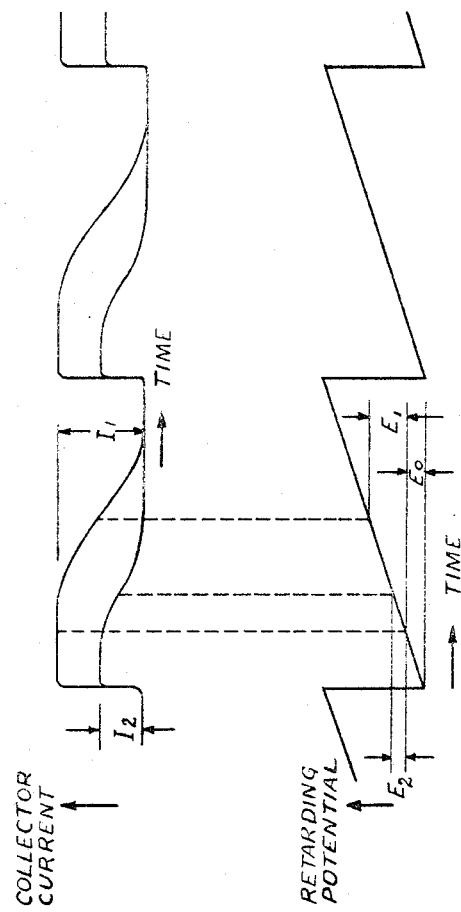

When the vehicle is rotated a little so that the direction in which the ion probe is facing is inclined at an angle, $a$, from the direction in which the vehicle is moving, the effective area upon which the ion probe is collecting ions through the front grid is reduced by the cosine of the angle, $a$. The velocity component of the ions perpendicular to the grids is also reduced by the square of the cosine of the angle, $a$. For example, as illustrated in FIGURE 4, the change in current from $I_1$ to $I_2$ is to a first approximation proportional to $\cos a$, while the change in the retarding potential from $E_1$ to $E_2$ is proportional to $\cos^2 a$. The potential of the vehicle is shown as $E_0$.

Ion probes have been extremely useful in the study of the density, composition, and temperature of the ions in the ionosphere. However, use of ion probes for navigation in low density atmosphere and in space depend on the fact that a space vehicle has a velocity ($\sim 0.8$ cm./$\mu$sec.) which is larger than the mean thermal velocity ($\sim 0.08$ cm./$\mu$sec.), so that to a good approximation, the vehicle can be regarded as moving through a sea of fixed ions. Therefore, the surfaces on the forward portion of the vehicle will be exposed to a flux of ions; likewise, the back side of the vehicle will be in an "ion shadow" where no ions will impinge on the surface. On the other hand, the electrons can approach the rear end of the vehicle almost as well as the front end because of their much greater velocity.

Figure 5:
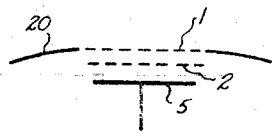
FIGURES 5, 6a and 6b show in schematic form different grid configurations for an ion probe similar to FIGURE 1.
Figure 6A:
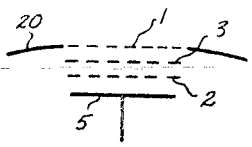
Figure 6B:
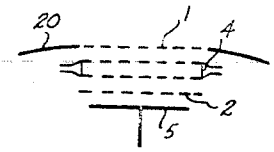

FIGURES 5, 6a and 6b aid in the understanding of the embodiments of the ion probes shown in FIGURES 7–10.

The simplest ion probe is shown in FIGURE 5, which has two grids and an ion collector. As in the FIGURE 1 ion probe, the entrance grid 1 is electrically connected to the vehicle surface 20. The suppressor grid 2 which is positioned next to ion collector 5, as in FIGURE 1, is held at a negative potential relative to the rocket thus functioning to screen collector 5 from incoming electrons and to suppress any photoelectrons emitted from the collector 5 when illuminated by solar radiation.

In an alternate form of ion probe shown in FIGURE 6a a modulating grid 3 is positioned between grids 1 and 2. A square wave voltage on this grid would modulate the incoming ion stream so that an alternating current amplifier (not shown) could be used to amplify the ion signal.

The ion probe shown in FIGURE 6b is similar to that of FIGURE 1 with the electrostatic shield omitted for clarification. Grid doublet 4 is positioned between grids 1 and 2 and may be used in the same manner as grid 3 of FIGURE 6a with greater uniformity of potential than the single grid 3.

The embodiments of the ion probes shown in FIGURES 7, 7a and 7b, which will be fully described hereinafter in the description of FIGURES 9 and 9a, utilize grids 1, 2, 3 and 4 which operate in the same manner as the corresponding grids of the FIGURES 5, 6a and 6b devices. In addition to grids 1, 2, 3 and 4, the ion probes of FIGURES 7, 7a and 7b also utilize grids 13 and 14 at the opposite end of the ion probe, the functioning of these last named grids being described hereinafter.

Figure 7:
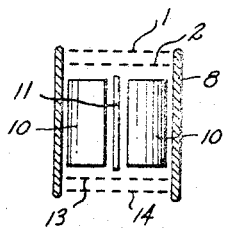
FIGURES 7, 7a and 7b show in schematic form embodiments of an ion probe of the present invention with the grid configuration of FIGURES 5, 6a and 6b at the upper end and a grid configuration at the lower end.
Figure 7A:
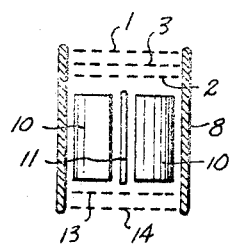
Figure 7B:
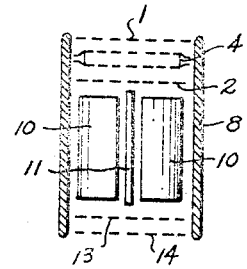
Figure 9:
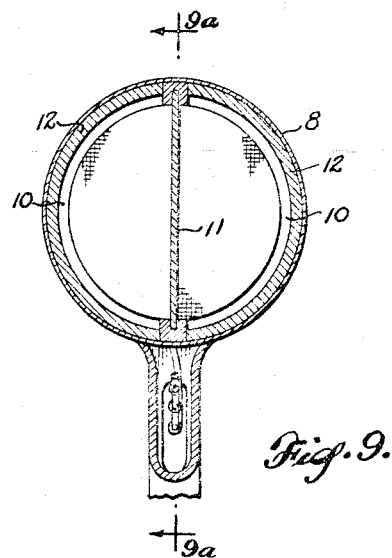
Figure 9A:
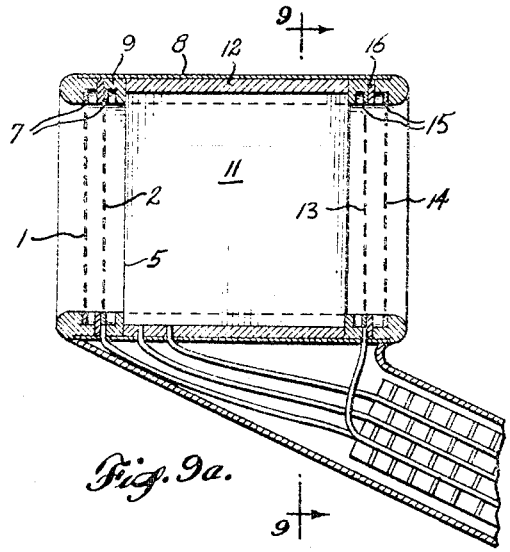
FIGURE 9a is a cross-sectional view of the ion probe taken on line 9a—9a of FIGURE 9.

In order for ion probes to be suitable for use on space vehicles, substantial changes must be made in the structure of the ion probes shown in FIGURES 1, 5, 6a and 6b, as illustrated schematically in FIGURES 7, 7a and 7b, and in cross-section in FIGURES 9 and 9a. For example, the knitted grids 1 and 2 described in FIGURE 1 are retained because of their demonstrated resistance to shock and vibration, but the flat annular grid rings are replaced with rings 7 having a much smaller frontal cross-section, said rings 7 being positioned in an open end cylindrical casing 8 and separated by insulation means 9. The collector plate is replaced with an essentially open structure consisting of a split cylinder having half sections 10 and a bisecting diaphragm or electrode means 11, half sections 10 and diaphragm 11 being mounted in insulating material 12 and positioned in casing 8 in the downstream direction from grid rings 7. A sweeping potential difference applied between split cylinder sections 10 and the diaphragm 11 will sweep all ions into the diaphragm where the ion current is collected and measured.

As stated hereinbefore, the average velocity of electrons in the upper atmosphere far exceeds the velocity of rockets and satellites and it is for this reason that an electron-repelling grid 13 (see FIGURE 9a) is located in casing 8 downstream from collector electrodes 2 to prevent electrons from entering the ion probe from the rear and reaching the collector. To the rear of grid 13 is another grounded grid 14 which functions the same as leading grounded grid 1, namely, to keep electric fields from protruding into the medium surrounding the probe. Grids 13 and 14 are fastened to grid rings 15 and insulated from each other by means 16. With additional grids 13 and 14 at the rear, positive ions cannot enter the ion probe from the rear because the velocity of the vehicle is much greater than the ion velocities in the upper atmosphere. Grids 1, 2, 13 and 14 are electrically connected to a control station in the manner shown in FIGURE 10.

Figure 8:
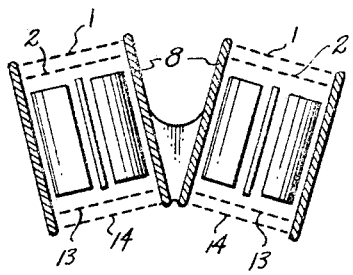
FIGURE 8 shows schematically a two-probe unit with the grid configuration of FIGURE 7.
Figure 10:
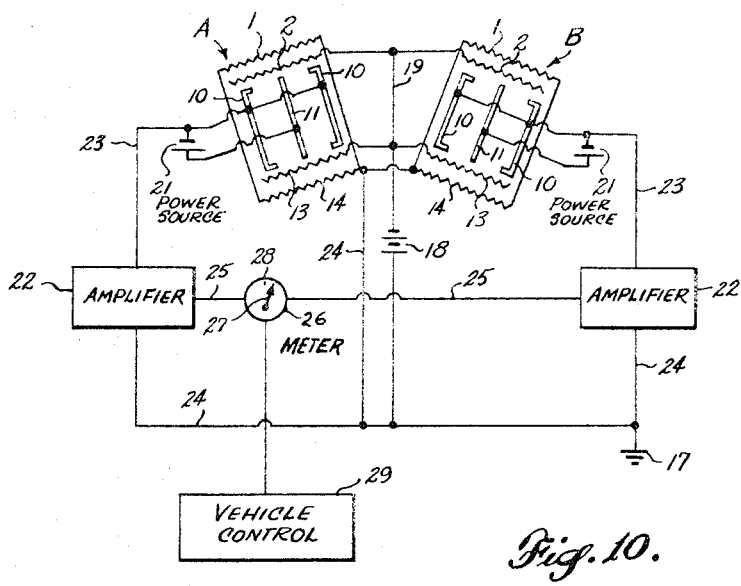
FIGURE 10 is a schematic diagram of an electrical system interconnecting a two-probe unit with a vehicle control station.

Referring to the electrical system of a two-probe unit of the FIGURE 8 type, FIGURE 10 shows ion probes A and B positioned at a predetermined angle with respect to one another for reasons set forth hereinafter. Movement of the space vehicle directs medium through the ion probes in a direction from grid 1 to grid 14.

Grids 2 and 13 of ion probes A and B are each connected to a power source such as battery 18 by connecting means 19 to provide a suitable negative potential relative to the vehicle in order to repel all incoming electrons and to suppress all photoelectrons emitted from collector elements 10 and 11 of the ion probes. Power source 21 is connected to the respective bisecting diaphragm 11 and the respective split cylinder sections 10 of each of the ion probes A and B, whereby power source 21 applies a potential difference between elements 10 and 11 which sweeps all ions into the diaphragm where the ion current is collected and transmitted to amplifier 22 for each ion probe through connection means 23.

Grids 1 and 14 of ion probes A and B are grounded at 17 to the space vehicle by connecting means 24 to prevent electric fields from charged electrodes within the ion probes from appreciably protruding into the space surrounding the vehicle and interfering with the free flow of charged particles in the surrounding medium towards the ion probes. Ground 17 is also operatively connected to amplifiers 22 by connecting means 24.

Amplifiers 22 each apply a potential through connecting means 25 to one terminal of meter 26 which is proportional to the current collected by their respective ion probes. Therefore, if the potential from each amplifier 22 is of the same value indicator needle 27 will be in center (zero) position 28 which shows to the pilot of the vehicle and/or to a ground control station that the vehicle is on the desired course. However, needle 27 moves away from center position 28, as shown in FIGURE 10, when the potential from amplifiers 22 is not of the same value which is due to the current flow from ion probes A and B being of different value because of the different orientation of the ion probes with respect to the direction of motion in the surrounding medium, thus indicating to the pilot and/or vehicle control means 29 that the vehicle is not on the desired course, said vehicle control means 29 being an automatic pilot or a ground control station for manned or unmanned vehicles, as desired.

The electrical system for interconnecting a greater number of ion probes with the meter 26 is within the skill of the art and has not been shown and described herein as such would unnecessarily enlarge the disclosure.

One method of mounting the ion probes is illustrated in FIGURE 11. Three ion probes are mounted below the lower edge of the rear end of the fuselage, and one ion probe is mounted above the upper edge. The right and left lower ion probes face downwards so that when the vehicle is at the approach angle of attack, say 50°, those ion probes will face in the direction of motion. The right and left hand ion probes also face outboard 15°, the right towards the right and the left ion probe towards the left. The center ion probe faces forward when the vehicle is at a cruising angle of say 5° so that the side ion probes are depressed 45° more than the center ion probe. In addition to the three lower ion probes, there is a fourth ion probe at the upper edge of the rear of the fuselage which faces directly forward. When the vehicle is at a substantial negative angle of attack, the three lower ion probes are in the ion shadow cast by the vehicle and these ion probes cannot operate. The upper ion probe is then out of the ion shadow and gives the pilot an indication of the negative angle of attack so that he can correct it.

Another arrangement is shown in FIGURE 12 in which there are three ion probes mounted below and three ion probes mounted above the rear end edge of the vehicle fuselage. In this arrangement, the center upper ion probe is directed upwards at about 50° relative to the horizontal axis of the vehicle. The upper side ion probes are directed upwards at 50° relative to the horizontal axis of the vehicle and outboard 15°. The three upper ion probes are connected to a circuit similar to those provided for the lower ion probes, and, function when the vehicle is flying upside down with a negative angle of attack, functioning in the same ways as do the three lower ion probes when the vehicle is flying with a positive angle of attack.

Even with the above changes in design, there is serious doubt that the ion probes would survive boost if permanently mounted in an exposed position. The ion probes should be covered during the initial boost and should be extended as soon as the vehicle has reached an altitude of at least 250,000 feet. The ion probes need not be retracted again but can be left extended because they will have served their principal functions before they begin to burn off. When the ion probes burn off, they cannot damage any other structure because they are already on the rear-most position.

It is of course quite possible that with further development work on the design of the ion probes, a design can be arrived at which will survive both boost and re-entry in a permanently extended position at the relatively protected positions at the rear of the fuselage, but the present design does not appear to have that capability.

The difference in maximum current to the right and left lower ion probes can be transformed electronically to a direct instrument reading of yaw for the pilot in a manner similar to that shown in FIGURE 10.

The ratio between the maximum current to the side ion probes and to the center ion probe can be transformed to a direct instrument reading of angle of attack. For accuracy in this measurement it will be necessary to calibrate the ion probe in the laboratory. This can readily be accomplished using known techniques.

The difference in cut-off voltage for the center and the side ion probes can be used for measuring the velocity of the vehicle through the medium to within 2%. While not as accurate as inertial systems when measuring velocity, the ion probe system would be adequate to detect malfunctioning of the inertial system and adequately function as the primary system under such conditions. The measurement of velocity by the ion probes will also require laboratory calibration by known methods. Further development of the ion probes will undoubtedly increase the accuracy of the system.

The slope of the cut-off potential of the ion probe when measuring the maximum current in combination with the value of the velocity measured in the manner described above can be transformed into a direct and rapid presentation of temperature of the medium, during the approach to re-entry, and as soon as the density of the medium has increased sufficiently for a bow shock to begin to form, the temperature indication will follow the initial increase in temperature.

Another arrangement is shown in FIGURES 13–15 in which three ion probes are mounted on a single long arm shown protruding from the nose of a space vehicle, which remains retracted during boost, is extended as soon as the vehicle is in flight or in orbit, and is retracted again as soon as the vehicle has descended to an altitude where shock formation and heating begin to be severe enough to damage the ion probes.

The side ion probes face down at about 50° and are level with the direction of flight when the angle of attack is 50°. The side ion probes also face outboard at 15°. The center ion probe faces forward when the vehicle is in level horizontal flight.

The three ion probes are supported on an arm which extends beyond the shock front of the vehicle when the vehicle is at angles of attack up to 50°.

With this arrangement, the three ion probes can be made to perform all of the functions of the previously proposed four- or six-probe installations for any angle of attack between a positive 50° and a negative angle of attack of about 20°, which includes all of the aspects presently anticipated. This arrangement has the additional advantage that the ion probes remain outside of the boundary layer longer than in the previous arrangements except for such complicating effects as result from the shallower shocks formed about the thin shells of the ion probes themselves.

The two-probe system shown can be enlarged by mounting other pairs of ion probes at different angles to the first pair, thus measurement can be made for each orientation for which ions pass through the respective grids, whereby the desired position of the vehicle can more accurately be maintained.

Ion probes are also applicable in aligning the vehicle for firing of the retro-rockets. In this case, the line of symmetry of the probe cluster would be pointed in the desired direction, and the pilot would maneuver the craft until the ion currents from all ion probes were equal, at which time the craft would be aligned correctly. In this operation a three-probe unit would suffice.

The capability of the knitted grids to survive extremely violent shock and vibration suggests that ion probes made with 0.002 inch tungsten grids might be found capable of surviving well into re-entry providing the shells and supporting structures are properly designed, and providing the ion probes are located well inside the shock layer during the severest re-entry conditions.

Arrangements of ion probes have been disclosed herein to provide an effective space vehicle navigation system having no moving parts except for the indicating meter, thus the possibility of malfunction of the system is minimized.

These and other arrangements of ion probes can be used for scientific investigations without adding any more objects to the outside of the vehicle. All that is needed in addition to letting the output of the ion probes actuate the pilot's instruments is to feed the output of the ion probes also into a data recorder for analysis after completion of the flight. From these records, the following can be obtained:

(a) *Ion composition.*—At the altitudes at which space vehicles will operate, the ions will predominantly be diatomic—mostly $NO^+$ with some $O_2^+$ and $N_2^+$. At the highest altitudes, when the vehicle is being reoriented in preparation for the approach to re-entry, there may be some atomic ions, mostly $O^+$, and a measure of these would be important basic information.

(b) *Electron density.*—This information is important in developing means for maintaining radio communications with the vehicle at all times. Continuing simultaneous measurements of electron density, orientation and time with synchronized records of radio signal strength will be very helpful on this problem.

(c) *Turbulence.*—Continuing records of velocity will also make it possible to detect any high velocity turbulence in the ionized upper atmosphere such as has been predicted by some investigators as resulting from solar streams or solar winds.

(d) *Potential of vehicle.*—A continuing record of the electrical potential of the vehicle will also be valuable for ascertaining the importance of photo-electric emission from the vehicle due to solar radiation. Any peculiar electrical charging effects caused by insulating surfaces on the vehicle would be detected in this way.

(e) *Velocity, altitude, temperature.*—The analysis of the detailed permanent records for velocity, altitude and temperature will permit a much more careful analysis of the flight conditions than the pilot could possibly make in flight. From such records it might be possible to detect and identify peculiarities of flight conditions or kinds of malfunction otherwise undetectable.

(f) *In later flights,* the ion probes can be commutated during alternate five-second intervals to a different set of applied voltages, to obtain the electron distribution. This is additional basic information which is needed in a broad range of studies.

The invention is not limited to the specific embodiments described herein as various other modifications of the invention may be contemplated by those skilled in the art without departing from the spirit and scope of the invention as hereinafter defined by the appended claims.

What I claim is:

1. A navigation system for a vehicle operating in low-density, highly-ionized atmosphere comprising
   a plurality of ion probe means, each of said ion probe means comprising
      a housing having a longitudinal axis,
      a plurality of grid means of knitted construction mounted transversely within said housing, and
      ion collector means comprising a pair of split cylinders and a diaphragm electrode member mounted within said housing in spaced relationship to said grid means and positioned to cause atmospheric ions to impinge on said collector means and generate an ion current, said split cylinders being insulated from said diaphragm electrode member,
   means mounting said plurality of ion probe means on said vehicle in position such that the longitudinal axes of said housings are disposed at angles to one another,
   control means for said vehicle, and
   means interconnecting said ion probe means and said control means,
   whereby the ion current from each collector means acts upon said control means to produce a desired control function for said vehicle.

2. A navigation system for a vehicle operating in low-density, highly-ionized atmosphere comprising
   a plurality of ion probe means, each of said ion probe means comprising
      a housing having a longitudinal axis,
      a plurality of grid means mounted transversely within said housing, and
      ion collector means mounted within said housing in spaced relationship to said grid means and positioned to cause atmospheric ions to impinge on said collector means and generate an ion current, said ion collector means comprising
         split cylinder means having a pair of semi-cylindrical elements disposed along a longitudinal axis coincident with the longitudinal axis of said housing, and
         diaphragm electrode means mounted in insulated relationship between said pair of semi-cylindrical elements and positioned along the longitudinal axis of said split cylinder means,
      said split cylinder means and said diaphragm electrode means constituting said ion collector means for generating ion control currents,
   means mounting said plurality of ion probe means on said vehicle in position such that the longitudinal axes of said housings are disposed at angles to one another,
   control means for said vehicle, and
   means interconnecting said ion probe means and said control means,
   whereby the ion current from each collector means acts upon said control means to produce a desired control function for said vehicle.

3. The combination according to claim 2 wherein said plurality of grid means are positioned across one end of said housing, and a plurality of additional grid means positioned across the other end of said housing, at least one of said grid means at each end of said housing being grounded to said casing means.

References Cited by the Examiner

UNITED STATES PATENTS

| | | | |
|---|---|---|---|
| 3,028,807 | 4/1962 | Burton et al. | 102—50 |
| 3,049,670 | 8/1962 | Paulson | 244—1 |
| 3,102,199 | 8/1963 | Zito | 250—83.6 |
| 3,116,035 | 12/1963 | Cutler | 244—1 |

OTHER REFERENCES

Astronautics, vol. 5, No. 6, June 1960, "The Tiros System on The Ground," by John E. Keigler and Charles B. Oakley. Page 101, column 1, lines 13–24 relied on.

Missiles and Rockets, vol. 8, No. 25, June 19, 1961, "Explorer Finds New Way to Orient," by Hal Gettings, page 16, column 2, line 25 through column 3, line 19 relied on.

BENJAMIN A. BORCHELT, *Primary Examiner.*

SAMUEL FEINBERG, *Examiner.*

T. A. ROBINSON, M. F. HUBLER, *Assistant Examiners.*